United States Patent
Mullin (10) Patent No.: US 12,289,398 B2
(45) Date of Patent: Apr. 29, 2025

(54) METHOD AND PROTOCOL FOR TRIPLE-BLIND IDENTITY MAPPING

(71) Applicant: Brian Richard Mullin, Budd Lake, NJ (US)

(72) Inventor: Brian Richard Mullin, Budd Lake, NJ (US)

(*) Notice: Subject to any disclaimer, the term of this patent is extended or adjusted under 35 U.S.C. 154(b) by 853 days.

(21) Appl. No.: 17/090,066

(22) Filed: Nov. 5, 2020

(65) Prior Publication Data
US 2021/0143985 A1     May 13, 2021

Related U.S. Application Data

(60) Provisional application No. 62/933,683, filed on Nov. 11, 2019.

(51) Int. Cl.
*H04L 9/08*      (2006.01)
*H04L 9/32*      (2006.01)

(52) U.S. Cl.
CPC ............ *H04L 9/085* (2013.01); *H04L 9/0827* (2013.01); *H04L 9/083* (2013.01); *H04L 9/3236* (2013.01); *H04L 9/3257* (2013.01); *H04L 2209/46* (2013.01)

(58) Field of Classification Search
CPC ....... H04W 4/80; H04W 12/50; H04W 12/06; H04W 4/029; H04W 84/18; H04W 76/14; H04W 8/005; H04W 84/12; H04W 12/63; H04W 76/11; H04L 67/12; H04L 63/0861; H04L 63/08; H04L 12/2807; H04L 12/2814; H04L 63/0823; H04L 65/1036; H04L 65/4084; H04L 63/083; H04L 63/0884; H04L 67/10; G06F 21/35; G06F 3/04817; G06F 21/32; G06F 3/04842; G06F 21/34; G06F 3/0482; G06F 13/382; G06F 16/685; G06F 21/44
USPC ........ 713/171, 150, 160, 181; 726/2, 21, 36; 380/255, 264, 276
See application file for complete search history.

(56) References Cited

U.S. PATENT DOCUMENTS

| | | | | |
|---|---|---|---|---|
| 8,467,770 B1 * | 6/2013 | Ben Ayed | ............... | G06F 21/35 455/411 |
| 9,026,053 B2 * | 5/2015 | Molettiere | ............. | A61B 5/112 455/41.2 |
| 9,158,925 B2 † | 10/2015 | Kamara | | |

(Continued)

FOREIGN PATENT DOCUMENTS

EP      3657834 B1 *    3/2024      ............ H04W 12/06

OTHER PUBLICATIONS https://eprint.iacr.org/eprint-bin/versions.pl?entry=2019/723, On Deploying Secure Computing Commercially: Private Intersection-Sum Protocols and their Business Applications, 48 pages, Jun. 18, 2019.†

(Continued)

*Primary Examiner* — Sharif E Ullah (57) ABSTRACT

A method and protocol for triple-blind identity mapping that sufficiently address the need to reduce accidental or nefarious attempts to re-identify the underlying identities pseudonymized by current hashing methods are disclosed. The system abates the privacy exposure risk derived from the simple exchange of hashed information, because the referenced actors do not come into possession of the input values required to produce a repeatable function.

16 Claims, 6 Drawing Sheets

(56) References Cited

U.S. PATENT DOCUMENTS

| | | | | |
|---|---|---|---|---|
| 11,520,870 | B2* | 12/2022 | Xia | H04L 63/083 |
| 2006/0199537 | A1* | 9/2006 | Eisenbach | G06F 21/6245 |
| | | | | 455/41.2 |
| 2009/0222910 | A1* | 9/2009 | Le Bihan | H04L 9/3273 |
| | | | | 726/19 |
| 2011/0314153 | A1* | 12/2011 | Bathiche | H04W 12/06 |
| | | | | 709/225 |
| 2013/0268758 | A1* | 10/2013 | Schrecker | H04W 12/069 |
| | | | | 713/168 |
| 2014/0019358 | A1* | 1/2014 | Priebatsch | G06Q 20/3274 |
| | | | | 705/44 |
| 2014/0165090 | A1* | 6/2014 | Andreasen | H04L 63/0815 |
| | | | | 725/25 |
| 2016/0234758 | A1* | 8/2016 | Qi | H04W 48/14 |
| 2019/0349426 | A1* | 11/2019 | Smith | H04L 9/3239 |

OTHER PUBLICATIONS https://link.springer.com/chapter/10.1007/978-3-642-30057-8_25, Policy-Enhanced Private Set Intersection: Sharing Information While Enforcing Privacy Policies, 18 pages, 15th International Conference on Practice and Theory in Public Key Cryptography, Darmstadt, Germany, May 21-23, 2012.† https://ieeexplore.ieee.org/document/8049726, PrivatePool: Privacy-Preserving Ridesharing, 16 pages, 2017 IEEE 30th Computer Security Foundations Symposium (CSF), Aug. 21-25, 2017.† https://fc14.ifca.ai/papers/fc14_submission_52.pdf, Scaling Private Set Intersection to Billion-Element Sets, International Conference on Financial Cryptography and Data Security, 18 pages, https://link.springer.com/chapter/10.1007/978-3-662-45472-5_13, FC 2014, Mar. 3-7, 2014, paper published online Nov. 9, 2014.† https://crypto.stackexchange.com/questions/14925/private-set-intersection-using-a-semi-trusted-server, Private set intersection, using a semi-trusted server, 2 pages, Mar. 11, 2014.† https://dl.acm.org/doi/10.1145/3319535.3345661, Two-party Private Set Intersection with an Untrusted Third Party, 18 pages, paper published online Nov. 6, 2019.† https://www.bis.org/ifc/publ/ifcb49_33.pdf, Privacy Preserving Set Intersection, 39 pages, Ninth IFC Conference on "Are post-crisis statistical initiatives completed?" Basel, Aug. 30-31, 2018.† https://doi.org/10.6028/NIST.SP.800-56Br2, NIST Special Publication 800-56B Revision 2: Recommendation for Pair-Wise Key Establishment Using Integer Factorization Cryptography, pp. 74-87 (14 pages) Section 8, Key Agreement Schemes, of 131 pages total, Mar. 2019.†

\* cited by examiner
† cited by third party

METHOD AND PROTOCOL FOR TRIPLE-BLIND IDENTITY MAPPING

This application claims benefit to U.S. Provisional Application No. 62/933,683, filed on Nov. 11, 2019, which application is incorporated herein by reference as set forth its entireties.

FIELD OF THE INVENTION

The present invention relates generally to the field of Information and Communication Technology (ICT) and more particularly to the field of detecting and sharing intersections of data sets without disclosing identifying information.

BACKGROUND OF THE INVENTION

Privacy and information security are emerging as the next big challenges of the information age. For decades, data has been shared, posted, and transmitted without much regard to the negative utility of disclosure. A new awareness in both the public consciousness and the legislative agenda threatens to impede technological progress before solutions are adopted to address it.

SUMMARY OF THE INVENTION

Various embodiments provide a method and protocol for triple-blind identity mapping that sufficiently address the need to reduce accidental or nefarious attempts to re-identify the underlying identities pseudonymized by current hashing methods. The present invention abates the privacy exposure risk derived from the simple exchange of hashed information, because the referenced actors do not come into possession of the input values required to produce a repeatable function.

In one embodiment, a computer-implemented method and protocol are provided that enable two or more data owners to directly map the modeled identities held in common without the requirement of disclosing identifying information to each other or any third party. Furthermore, future re-identification is inhibited through the use of a central web service that acts as a neutral facilitator with specific qualities namely, (a) the inability to produce the surrogate keys used to equate identities due to lacking the deterministic inputs of the key construction, and (b) the ability to hold surrogate keys in escrow while regulating the sharing of information between data owners exclusively to those identities indicated in the occurrence of a positive match; and     a non-transitory computer readable medium having stored thereon instructions that, upon execution by the at least one computing device, cause the computing device to perform the steps comprising:
    (a) accepting a request to exchange data propagated toward the at least one computing device;
    (b) defining new mapping execution between the exchange apparati;
    (c) propagating toward said exchange apparati parameters necessary to evaluate the acceptability of the data exchange; and
    (d) receiving from said exchange apparati parameters defining the status of the request;
    wherein all parties to the exchange of information are blind thereby making the exchange secret and unintentional disclosure and re-identification of the underlying identities of the exchange apparati are inhibited.

BRIEF DESCRIPTION OF THE DRAWINGS

The teachings of the present invention can be readily understood by considering the following detailed description in conjunction with the accompanying drawings, in which.

To facilitate understanding, identical reference numerals have been used to designate elements having substantially the same or similar structure and/or substantially the same or similar function.

DETAILED DESCRIPTION OF THE INVENTION

Various embodiments provide a method and protocol for triple-blind identity mapping that sufficiently address the need to reduce accidental or nefarious attempts to re-identify the underlying identities pseudonymized by current hashing methods. The present invention abates the privacy exposure risk derived from the simple exchange of hashed information, since the referenced actors do not come into possession of the input values required to produce a repeatable function.

Privacy and information security are emerging as the next big challenges of the information age. For decades, data has been shared, posted and transmitted without much regard to the negative utility of disclosure. A new awareness in both the public consciousness and the legislative agenda threatens to impede technological progress before solutions are adopted to address it.

Several approaches to exchange the knowledge of identity are used industry today. At the most basic level, identifiers can take proprietary or universal forms. An example of a proprietary identifier may be a sequence number assigned by a retailer to an individual customer. The customer number will likely have no significance outside of the internal operations of the retailer. Conversely, a universal identifier could be an Internet email address (specified in RFC 3696). The email address may identify the same individual in data sets across the globe. By transferring a list of email addresses to another entity, one can share knowledge of common identities by exact comparison of the incoming list of email addresses against an internal collection of email addresses. The downside of an approach that transfers universal identifiers (such as email address) is that the receiver now can use the same list of email addresses to compare against outside or future sources. This shifts the awareness identities beyond the control of the sender of the identifiers. It also represents a possible disclosure of identifying information. Henceforth, the recipient of the email addresses has the opportunity to discover new identities they were unaware of prior to the exchange. A common method to mitigate this oversharing of identifying information is to hash the identifier prior to transfer. A hash algorithm is a deterministic function that produces a fixed-size digest from an arbitrary input value. Because a given input always yields a given output, the output of a hash function can be used as a surrogate or proxy identifier for the original input. In the online marketing industry, this is typically accomplished using a cryptographic hash algorithm such as MD5, (Message-digest Algorithm), which is a widely used hash function producing a 128-bit hash value, SHA-1 or SHA-2 (Secure Hash Algorithm). The transformed identifier is difficult to reverse and can protect against a future attempt to reveal the original universal identifier. This approach still enables the recipient to compare the equality of two (2) or more hashed identifiers. A severe limitation, however, is that anyone can reproduce the same hashed value to inspect equality against outside of future sources. It is this shortcoming that fails to prevent re-identification.

Another known technique is to add a secret value to the identifier prior to the hash transformation. The net effect to selectively enable future hash comparisons to only those entities with access to the secret value. Unfortunately, this is simply a change in scale. Re-identification is still a risk factor with attack vectors to any entity holding the secret value. Many industries are still in need of a method to exchange knowledge of identities while preventing disclosure and reducing the risk of re-identification.

The illustrative method and protocol for triple-blind identity mapping embodiments described herein are not meant to be limiting. It may be readily understood that certain aspects of the disclosed method and protocol for triple-blind identity mapping can be arranged and combined in a variety of different configurations, all of which are contemplated herein.

Generally speaking, any computing device such as a laptop, desktop, server, tablet, cellular telephone or smart phone or any computing device having similar functionality may implement the various embodiments described herein. In various embodiments, any Internet enabled device such as personal digital assistant (PDA), laptop, desktop, electronic book, tablets and the like capable of accessing the Internet may implement the various embodiments described herein. While computing devices are generally discussed within the context of the description, the use of any device having similar functionality is considered to be within the scope of the present embodiments.

Figure 1:
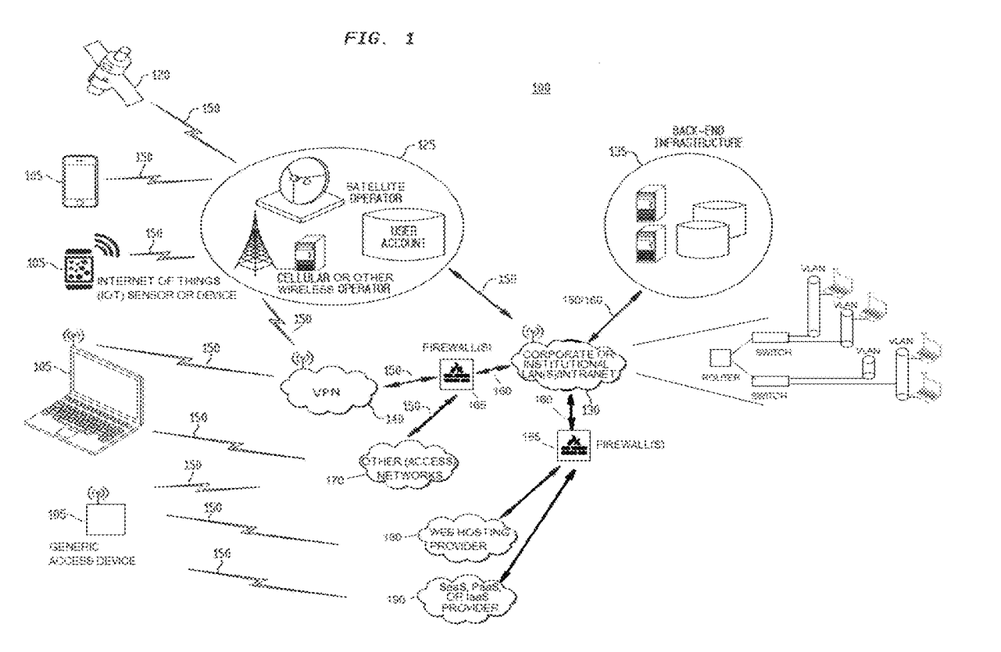
FIG. 1 depicts a high-level block diagram of a system benefiting from embodiments of the present invention.

Referring now to the figures, FIG. 1 is a simplified block diagram of a triple-blind system for devices 100, according to an exemplary embodiment herein described.

In one embodiment, the user interacts with networks 120, 125, 135, 130, 140, 170, 180, 190 via link 150/160. In one embodiment, link 150 extends over great distance and is a cable, satellite or fiber optic link, the Internet, the Cloud, a combination of such links or any other suitable communications path. In various embodiments, link 150 extends over a short distance. In one embodiment, link 150 is a network connection between geographically distributed systems, including network connection over the Internet. In other embodiments, link 150 is wireless, an access network, a virtual private network.

In various embodiments, device 105 is a smart phone, cellular telephone, personal digital assistant (PDA), wireless hotspot or any Internet-enabled device including a desktop computer, laptop computer, tablet computer, smart watch 500, smart remote control 600, smart credit card, IoT (Internet of Things) sensor, IoMT (Internet of Medical Things) sensor and the like capable of accessing the Internet may be used for device 105.

In various embodiments, Satellite 120 is a geo-synchronous satellite system such as global positioning system (GPS). In one embodiment, satellite 120 is low earth orbit satellite system. In other embodiments, the use of any system having similar functionality is considered to be within the scope of the present embodiments.

In various embodiments, cellular system 125 is a wireless infrastructure supporting cellular network functionality. In one embodiment, cellular system 125 is a small area wireless system. In other embodiments, cellular system 125 is a wide area wireless system. In other embodiments, cellular system 125 is a Wi-Fi system. In various embodiments, cellular system 125 supports mobile services within an LTE (Long Term Evolution) network or portions thereof, those skilled in the art and informed by the teachings herein will realize that the various embodiments are also applicable to wireless resources associated with other types of wireless networks (e.g., 5G networks, 4G networks, 3G networks, 2G networks, WiMAX, CDMA, GSM, etc.), wireline networks or combinations of wireless and wireline networks. Thus, the network elements, links, connectors, sites and other objects representing mobile services may identify network elements associated with other types of wireless and wireline networks. In other embodiments, the use of any wireless system having similar functionality is considered to be within the scope of the present embodiments.

In various embodiments, network 130 is an access network. In one embodiment, network 140 is a virtual private network (VPN). In other embodiments, network 130 is any network having similar functionality and as such is considered to be within the scope of the present embodiments.

Backend infrastructure 135 generally refers to infrastructure associated with the server or host, a web server. In other embodiments, networking system 100 include additional, fewer, or different modules for various applications. Conventional components such as network interfaces, security functions, load balancers, failover servers, management and network operations consoles, and the like are not shown for better explanation of the details of the triple-blind system for devices having modeled identities held in common.

Web hosting provider 180 refers to the universe of hosting services, e.g., smaller hosting services, larger hosting services and host management.

Saas (Software as a service), PaaS (Platform as a service) or IaaS (Infrastructure as a service) provider 190 refers to cloud services, hosting and the like.

In one embodiment, one or more of the backend infrastructures 135, web hosting provider 180, cellular system 125, networks and devices of 100, not limiting thereto, may participate to exchange identity data under an understanding, without disclosing the identifying information. The participants comprising anyone of the entities in the system 100 may don one or more roles of a data exchange partner and/or a facilitator in the system referred to herein as triple-blind system.

FIG. 2 through FIG. 5 are the block diagrams and flowchart of the exemplary triple-blind system illustrating operations of execution of identity data mapping in an exemplary embodiment.

Figure 2:
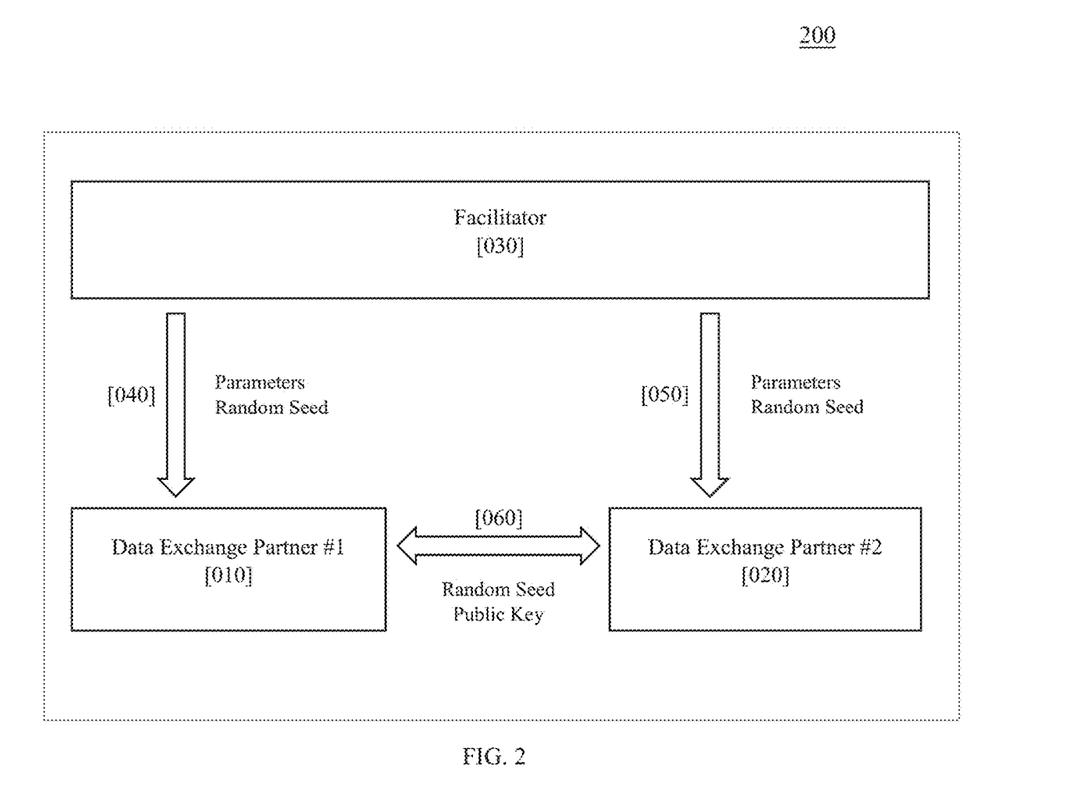
FIG. 2 depicts a diagram of the interaction between exchange participants according to an embodiment of the invention.

FIG. 2 depicts a diagram of the interaction between exchange participants according to an embodiment of the invention. The data exchange partner (#1) 010, and data exchange partner (#2) 020 are exemplary data exchange partners, desirous of exchanging and sharing secured identity data that is otherwise not known to each other. In another embodiment, the data exchange partners want to exchange or snare secured identity data that is otherwise not known to each other. Though only two exchange partners 010 and 020 are illustrated for convenience of illustration, the system may comprise any number of participants desiring to exchange identity data, any number of pair of participants desirous to exchange the identity of data between them, etc. all participating exchange partners in plurality are referred to as apparati herein.

In the exemplary triple-blind system, protected data stores 070 and 080 hold the protected proprietary and private data for the data exchange partners 010 and 020 respectively. In other embodiments, protected data stores 070 and 080 comprise one or more volatile and/or nonvolatile storage components such as optical, magnetic, and/or organic storage and protected data stores 070 and 080 are integrated in whole with exchange partners 010 and 020 respectively. In yet other embodiments, protected data stores 070 and 080 are integrated in part with exchange partners 010 and 020 respectively. Each protected data store 070 and 080 comprise identifying information such as a sequence number assigned by the data exchange partners 010 and 020 to their data units, internet email address(es), phone numbers, name, address, activity, transactions, history, digital certificate and details thereof, business information, information considered private at least as in RFC 6973, for example. In one embodiment, the identifying information is partially associated to form the identity data units. In another embodiment, the identifying information is fully associated to form the identity data units.

In one embodiment, data exchanges partners 010 and 020 require sharing the data units in whole with each other for performing several cooperated actions, cooperated activities and transactions such as logging in to the servers, networks, services, infrastructure facilities, authentication services, cooperated business transactions, mutual authentication, cooperated services, distributed services, and the like.

In another embodiment, data exchanges partners 010 and 020 require sharing the data units in part with each other for performing several cooperated actions, cooperated activities and transactions such as logging in to the servers, networks, services, infrastructure facilities, authentication services, cooperated business transactions, mutual authentication, cooperated services, distributed services, and the like.

In one embodiment, facilitator 030, executes identity mapping by donning a role of neutral third party to both exchange partners 010 and 020. The facilitator 030 facilitates identity mapping to create a triple-blind scenario where all the data exchanges partners 010, 020 and the facilitator 030 cannot view identifying information that are not known to each participant prior or after exchange.

In another embodiment, facilitator 030, executes identity mapping by donning a role of neutral third party to both exchange partners 010 and 020. The facilitator 030 facilitates identity mapping to create a triple-blind scenario where all the data exchanges partners 010, 020 and the facilitator 030 cannot access identifying information that are not known to each participant prior or after exchange. The facilitator 030 is conjoined with the data exchanges partner 010 and 020 in the process of implementing the triple-blind scenario. The facilitator 030 limits the flow of undiscovered identities between the data exchange partners 010 and 020. In one embodiment, facilitator 030 is implemented as a service provider in the system 100. In another embodiment, facilitator 030 is implemented as a web server in system 100. In one embodiment, one or more devices of system 100 operate in part as the facilitator 030. In another embodiment, one or more devices of system 100 operate in whole as the facilitator 030. The facilitator 030 and the exchange partners 010 and 020 are communicatively coupled through one or more links of the networks in system 100.

In one embodiment, the identity mapping is performed in plurality of phases. FIG. 2 illustrates the initial phase of the computer implemented method of identity mapping. The initial phase is entered into via a request to facilitator 030. In the initial phase the facilitator 030 sends instructions 040 and 050 simultaneously to the data exchanges partners 010 and 020. In other embodiment, the facilitator 030 sends instructions 040 and 050 intermittently to the data exchanges partners 010 and 020. The instruction comprises data and parameters that define the identity mapping and data and parameters required for execution of the identity mapping. For example, the instruction 040 and 050 may comprise protocol, encryption parameters, order of priority, ordinal number and the parameters for execution of identity mapping.

The self generated data 060 in the exemplary system of FIG. 2 shows the exchanged between the data exchange partners 010 and 020. The self generated data 060 comprises a random seed and a public key, for example. The data exchange partners 010 and 020 generate a pseudo-random number and a public/private key pair. The pseudo-random number referred to as seed and the public key of the public/private key pair, together referred to as swap parameters 060. In other embodiment, the data exchange partners 010 and 020 generate a random number and a public/private key pair. The random number referred to as seed and the public key of the public/private key pair, together referred to as swap parameters 060.

Figure 3:
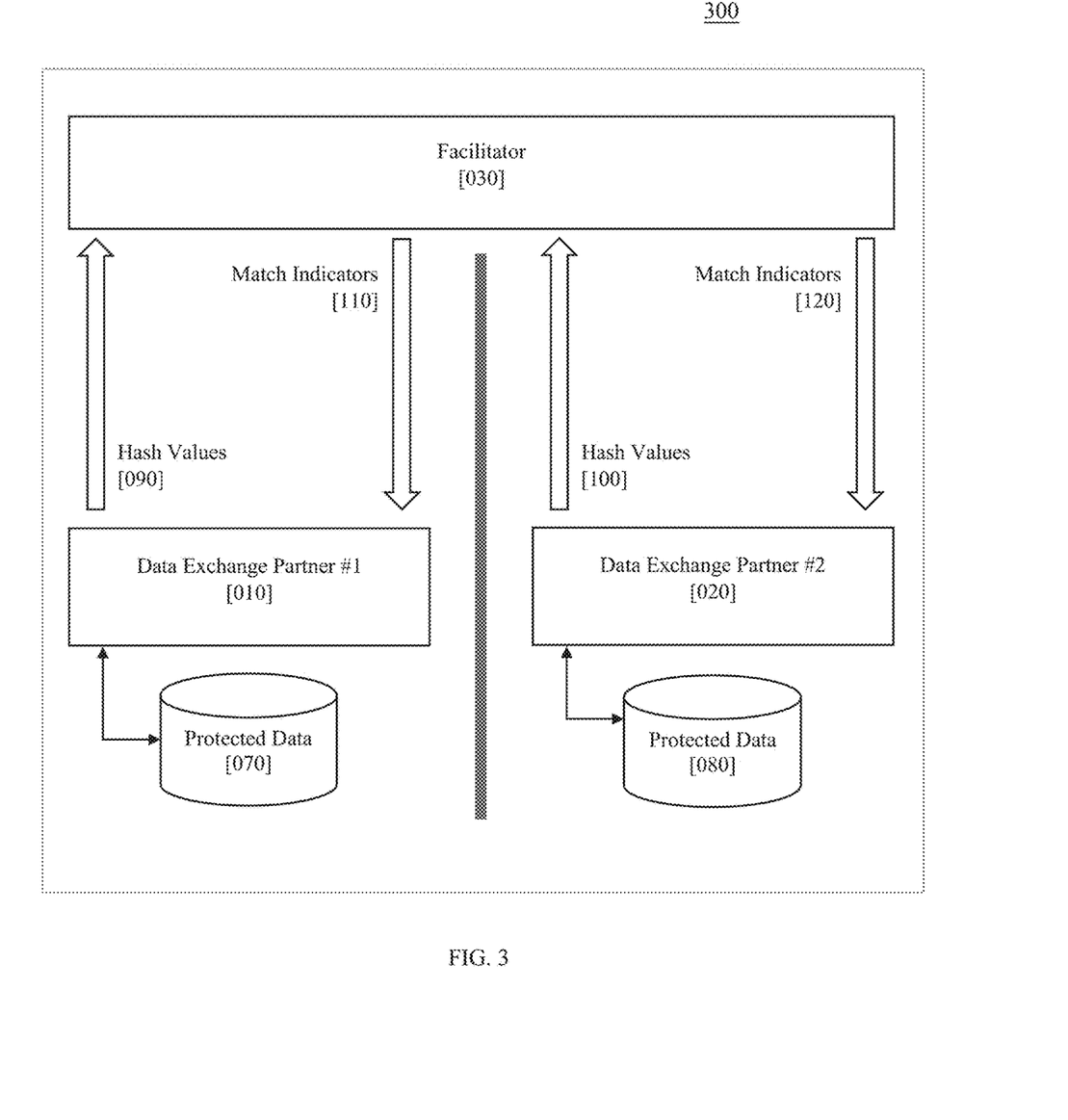
FIG. 3 depicts a diagram of the interaction between exchange participants during the late phase of the mapping sequence according to an embodiment of the invention.

FIG. 3 illustrates the second phase of the computer implemented method of identity mapping. As shown, the data exchange partners 010 and 020 fetch the protected identity data from the respective protected data store 070 and 080. The fetched identity data is transformed into hash values using an additional data generated from the union of the instructions 040 and 050. The data exchange partners 010 and 020 transmit the transformed hash values 090 and 100 to the facilitator 030. A cryptographic hash function (CHF) is a mathematical algorithm that maps data of arbitrary size (often called the "message") to a bit array of a fixed size (the "hash value", "hash", or "message digest"). It is a one-way function. Specifically, a one-way function is practically infeasible to invert. Ideally, the only way to find a message that produces a given hash is to attempt a brute-force search of possible inputs to see if they produce a match or use a rainbow table of matched hashes. Cryptographic hash functions are a basic tool of modern cryptography.

The ideal cryptographic hash function has the following main properties:

it is deterministic, meaning that the same message always results in the same hash;
it is quick to compute the hash value for any given message;
it is improbable to generate a message that yields a given hash value (i.e., to reverse the process that generated the given hash value);
it is infeasible to find two different messages with the same hash value;
a small change to a message should change the hash value so extensively that the new hash value appears uncorrelated with the old hash value (avalanche effect).

Cryptographic hash functions have many information-security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption. Indeed, in information-security contexts, cryptographic hash values are sometimes called digital fingerprints, checksums, or just hash values, even though all these terms stand for more general functions with rather different properties and purposes.

Next, the facilitator 030 compares the hash values received from the data exchange partners 010, 020 and from any and all other participating parties. The facilitator 030 communicates comparison results indicating the matching status for hash values received by the data exchange partners. In one embodiment, the facilitator 030 communicates the matching status via a dichotomous data element 110 and 120 labeled as match indicator to the exchange partners 010 and 020 respectively. In one embodiment, the match indicator carries the value "N" corresponding to non-match status. In another embodiment, the match indicator carries the value "Y" for match indicator in the composition result. The hash values along with the match indicator are sent to the exchange partners. Thus, each exchange partner may determine matching of identity data with its partner and no identity data is exchanged between them. Thus, forming triple-blind identity data mapping scenario in the system.

Due to the triple-blind identity data mapping, the data exchange partners do not gain access to any identifier or identifiers that are not in its awareness and do not gain access to any hash values not calculated specifically by its own transformation. The way the execution of mapping is performed in an embodiment is further described below.

Figure 4:
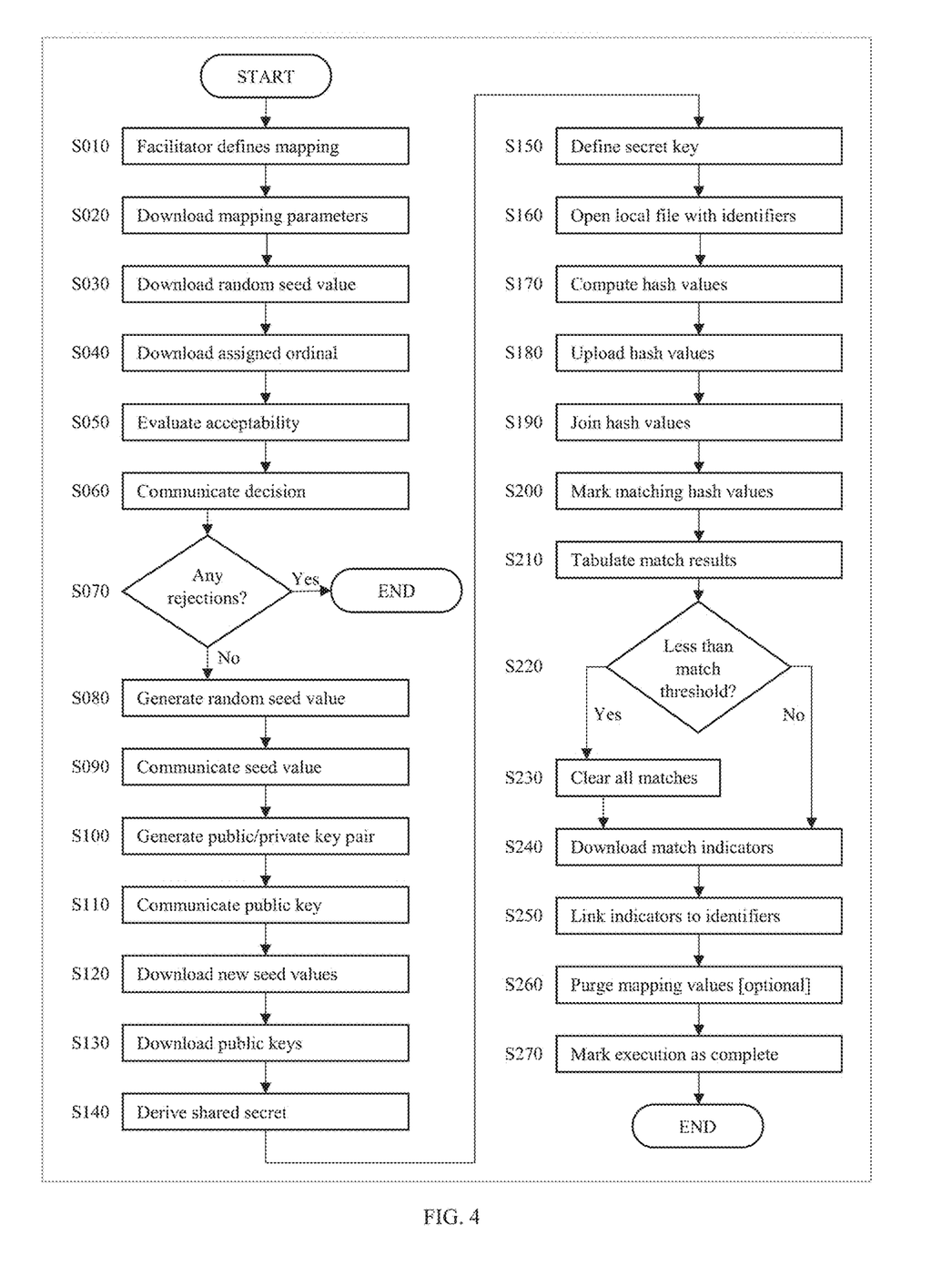
FIG. 4 is a flowchart which illustrates a more detailed sequence of operations for a single mapping execution, in accordance with an embodiment of the invention.

Now referring to FIG. 4, a block diagram illustrating the execution of data mapping in an embodiment is shown. In block S010, the facilitator 030 defines and initiates a new mapping execution between data exchange partners. The facilitator 030 initiates new mapping execution upon receiving a request from one or more execution partners 010 or 020. In one embodiment, the request is local using a user interface. In another embodiment, the request is remotely initiated using one of the following methods: (1) a web browser; (2) a request app; (3) artificial intelligence software (voice assistants) accessed by a button or voice command and designed to answer voice-initiated request; (4) smart key boards. The remote access is ultimately linked to the local user interface via the internet. The user interface includes selected data identifiers, mapping outcomes, encryption parameters, and order or mapping priority. The user interface is further described below in reference to FIG. 6. In one embodiment, the facilitator 030 initiates the new mapping execution at a predefined, scheduled and triggered activity. In another embodiment, the facilitator 030 initiates the new mapping execution at a predefined, scheduled or triggered activities. The facilitator 030 communicates to exchange partners the initiation of the new mapping execution over the communication links using the applicable protocol as shown in FIG. 4. In one embodiment, the communication links include cellular wireless operator 125. In another embodiment, the communication links include satellite operator 125. Yet, in other embodiments, the communication links include other types of communications transport infrastructure.

In block S020, each data exchange partner 010 and 020 download the set of mapping parameters from the facilitator. The order of downloading the mapping parameters is insignificant. In one embodiment, the set of mapping parameters is made available on a common interface accessible to the entire execution partners. In another embodiment, the set of mapping parameters is made available on a buffer accessible to one partner at a time.

In block S030, each data exchange partner 010 and 020 downloads a random seed value from the facilitator. The random seed value enables the exchanged participants to locally generate their own random number for encryption and key generation for example. A random seed specifies the start point when a computer generates a random number sequence. This can be any number, but it usually comes from seconds on a computer system's clock.

In block S040, each data exchange partners 010 and 020 downloads its assigned ordinal position from the facilitator. An Ordinal Number is a number that tells the position of something in a list, such as 1st, 2nd, 3rd, 4th, 5th etc. Most ordinal numbers end in "th" except for: one⇒first (1st) two⇒second (2nd) three⇒third (3rd). In block S050, each data exchange partner 010 and 020 decides to accept or reject the mapping based on the specified parameters.

In block S060, each data exchange partner 010 and 020 informs the facilitator of their acceptance or rejection. In the event of rejections by all the data exchange partners, the execution of mapping is terminated; else the execution of mapping is continued among the accepted plurality of execution partners.

In block S070 facilitator 030 checks any exchange partner rejects the mapping, then the facilitator marks the mapping execution as rejected. On acceptance of execution of identity mapping by the execution partners 010 and 020, in block S080 each data exchange partner generates a random seed value. The data exchange partners generate seed using the seed value received from the facilitator 030 as part of the mapping parameter. In another embodiment, the data exchange partners generate seed using its own generated seed value.

In block S090 each data exchange partner 010 and 020 sends its random seed value to facilitator 030.

In block S100 each data exchange partner 010 and 020 generate a public/private key pair. There are several well-known mathematical algorithms that are used to produce the public and private key. An artisan of ordinary skill in the art is familiar with these algorithms. Some well-respected examples of public private key encryption are Rivest-Shamir-Adleman (RSA), DSS (Digital Signature Standard) and various elliptic curve techniques. Some public key algorithms provide key distribution and secrecy (e.g., Diffie-Hellman key exchange), some provide digital signatures (e.g., Digital Signature Algorithm) and some provide both (e.g., RSA). A sender can combine a message with a private key to create a short digital signature on the message. Anyone with the sender's corresponding public key can combine the same message and the supposed digital signature associated with it to verify if the signature is valid, i.e., made by the owner of the corresponding private key.

Any known encryption to e.g., S/MIME, which stands for (Secure/Multipurpose Internet Mail Extensions) is a widely accepted method (or more precisely, a protocol) for sending digitally signed and encrypted messages. S/MIME allows you to encrypt emails and digitally sign them. It also helps enhance privacy and data security (using encryption) for electronic messaging, Pretty Good Privacy (PGP), GNU Privacy Guard (GPG) and the like may be employed by the data exchange partners 010 and 020 for generating the public/private key pair defined by the facilitator 030.

In block S110 each data exchange partner 010 and 020 sends its public key to facilitator 030.

In block S120 each data exchange partner 010 and 020 downloads the random seed values generated by other data exchange partner from the facilitator 030.

In block S130 each data exchange partner 010 and 020 downloads the public keys generated by other data exchange partners from the facilitator 030.

In block S140 each data exchange partner 010 and 020 derives a shared secret shared with the other data exchange partners, using a key exchange mechanism in conjunction with its one private key and the downloaded public keys. The shared secret may be encrypted identity credentials that is intended to the shared between the exchange partners 010 and 020.

In block S150 each data exchange partner 010 and 020 defines a secret key by concatenating all the data exchange partners random seed values, in the order of their assigned ordinal position followed by the facilitator random seed value, followed by the shared secret derived from the key exchange mechanism.

In block S160, each data exchange partner 010 and 020 opens a locally accessible data file with identifying information stored within.

In block S170, each data exchange partner computes a hash value for each identity using a crypto graphic hash algorithm with the secret key and the identifier inputs.

In block S180, each data exchange partner 010 and 020 uploads the computed list of hash values to the facilitator 030.

In block S190, the facilitator 030 compares the hash values provided by the data exchange partners. The comparison may be performed for match among the received hash values.

In block S200 the facilitator 030 marks the hash values with a match indicator based on the result of the comparison operation in the block S190.

In block S210 the facilitator 030 tabulates the quantity of match indicator to total number of matches and total number of non-matches.

In block S220 the facilitator 030 evaluates the total number of matches against a minimum threshold pre-negotiated by the data exchange partners 010 and 020 with the absolute minimum value (for example 30).

In block S230, the facilitator 030 clears all matches if the total number of matches is less than the minimum threshold. That is, all hash values are marked with a match indicator denoting a non-match.

In block S240, each data exchange partners 010 and 020 downloads the list of hash values tagged with the match indicators from the facilitator 030.

In block S250, each data exchange partner 010 and 020 links the match indicators back to the original identifying information by using the hash values as a joined expression based on equality of the hash values downloaded from the facilitator 030 to the hash value uploaded by the data exchange partner 010 and 020.

In block S260, each data exchange partner 010 and 020 can optionally purge data values created during this execution, including any or all of the mapping parameters. All random secret, the defined secret key and all computed hash as complete. In block S270, the facilitator marks the mapping execution as complete.

In one embodiment, facilitator 030 is implemented as centralized JavaScript Object Notation (JSON) web service to perform the operations and responsibilities of the facilitator 030 described in the sections above. The data exchange partners 010 and 020 are configured to execute an application within its computing environment that would interact with the web service JSON via the internet and/or communication link.

In one embodiment, the facilitator defines the elliptic curve Diffie-Hellman (ECDA) algorithm to be employed to provide a mechanism to derive a shared secret between the trading (exchange) partners 010 and 020.

A hash based message authentication code creates the hash values from two (2) input categories namely, (1) the clear—text identifying information of the modeled identity, and (2) the secret key constructed from the concatenation of the random nonce's and derived shared secret. Generally, a nonce in cryptography is a number used to protect private communications by preventing replay attacks. Nonces are random or pseudo-random numbers that authentication protocols attach to communications. In one embodiment, these numbers include a timestamp to intensity the fleeting nature of these communications. In other embodiments, a timestamp is not included.

In one embodiment, the HMAC-SHA384 crypto graphic hashing algorithms are employed as hash function. HMAC-SHA384 is a type of keyed hash algorithm that is constructed from the SHA-384 hash function and used as a Hash-based Message Authentication Code (HMAC). The HMAC process mixes a secret key with the message data and hashes the result. In a nutshell, HMAC SHA-384 is the method that Proton VPN uses to assure that messages are safe traveling between a certain device and the VPN servers. It authenticates that the traffic being sent between the originating device really came from the originating servers and that it has not been tampered with along the way. Stated differently, by using HMAC SHA-384, it is assured that once data exchange partners 010, 020 are connected to one of the web servers, the connection cannot be interfered with or spoofed.

In an alternative embodiment, facilitator 030 is implemented as a decentralized facilitator. Yet, in other embodiments, the facilitator is implemented in a dual redundancy arrangement as described below.

In some embodiments, a function alternative cryptographic hash algorithm such as SHA3 and BLAKE2 or alternative key exchange mechanism such as ECDHE (Elliptic-curve Diffie-Hellman Ephemeral) and MVQ (Menezes-Qu-Vanstone) are employed for key generation and Hash value generation. SHA-3 (Secure Hash Algorithm 3) is the latest member of the Secure Hash Algorithm family of standards, released by NIST on Aug. 5, 2015. Although part of the same series of standards, SHA-3 is internally different from the MD5-like structure of SHA-1 and SHA-2. BLAKE2 is a cryptographic hash function based on BLAKE, created by Jean-Philippe Aumasson, Samuel Neves, Zooko Wilcox-O'Hearn, and Christian Winnerlein. The design goal was to replace the widely used, but broken, MD5 and SHA-1 algorithms in applications requiring high performance in software. BLAKE2 removes addition of constants to message words from BLAKE round function, changes two rotation constants, simplifies padding, adds parameter block that is XOR'ed with initialization vectors, and reduces the number of rounds from 16 to 12 for BLAKE2b (successor of BLAKE-512), and from 14 to 10 for BLAKE2s (successor of BLAKE-256).

MQV (Menezes-Qu-Vanstone) is an authenticated protocol for key agreement based on the Diffie-Hellman scheme. Like other authenticated Diffie-Hellman schemes, MQV provides protection against an active attacker. The protocol can be modified to work in an arbitrary finite group, and, in particular, elliptic curve groups, where it is known as elliptic curve MQV (ECMQV). Elliptic-curve Diffie-Hellman (ECDH) is a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. It is a variant of the Diffie-Hellman protocol using elliptic-curve cryptography.

Figure 5:
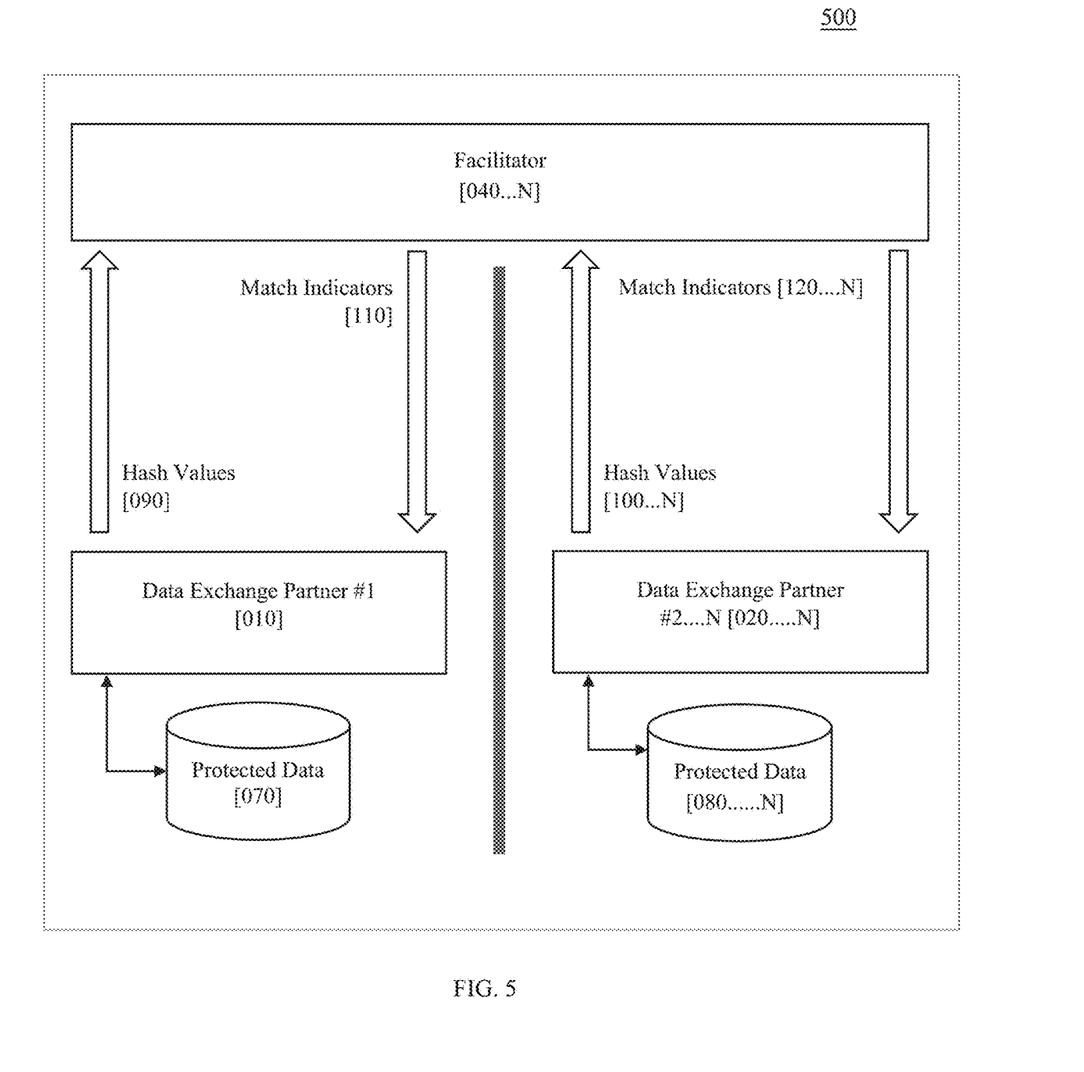
FIG. 5 depicts a diagram of dual redundancy arrangement according to an embodiment of the invention.

FIG. 5 depicts diagram showing a dual redundancy arrangement according to a embodiment of the invention. In this embodiment, the facilitator is structured in a dual redundancy arrangement namely, a primary facilitator (030) and a secondary facilitator (040). This arrangement allows for continuous operation of the system should the primary facilitator (030) be taken off-line by an attacker or another event. In one embodiment, the primary facilitator initiates the handshake using the same protocol between the facilitator and exchange partners allowing the two facilitators to communicate incognito with each other. In other embodiment, the secondary facilitator uses the same handshake that is utilized in initiating a request protocol as explained above. In one embodiment, facilitator (040) is a member the handshake between facilitator (030) and exchange partners (010) and (020) and remains anonymous to the exchange partners and facilitator (030). In other embodiments, facilitator (040) becomes the primary facilitator for a different bank of exchange partners and still maintains the redundancy role and in this case facilitator (030) plays the dual redundant role for the bank of exchange partners that (040) is the primary facilitator for. The same protocol describes in reference to FIG. 4 is used in this arrangement.

Figure 6:
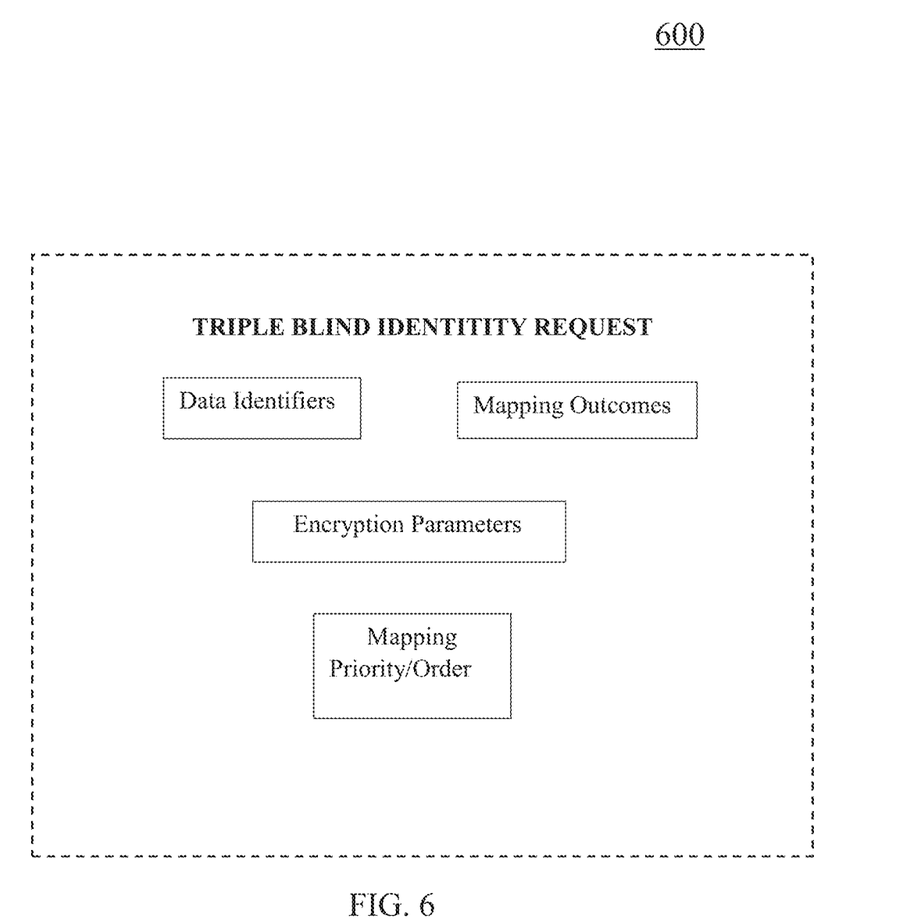
FIG. 6 depicts a diagram of a user interface arrangement according to an embodiment of the invention.

FIG. 6 depicts a diagram of a user interface arrangement according to an embodiment of the invention.

The user interface is the aesthetic design of all visual elements of the system namely, presentation and interactivity. Stated differently, the user interface (UI) is the point of human-computer interaction and communication in a device. This includes display screens, mouse, the appearance of a desktop keyboards and the like. Additionally, it is the way through which a user interacts with an application or a website. The different types of user interfaces include: (1) graphical user interface (GUI); (2) command line interface (CLI); (3) menu-driven user interface; (4) touch user interface; (5) voice user interface (VUI); (6) form-based user interface; (7) natural language user interface. The system's user interface allows the user to provide (input) selected data identifiers, mapping outcomes, encryption parameters, and order or mapping priority.

The foregoing description of the embodiments of the invention has been presented for the purpose of illustration. It is not intended to be exhaustive or to limit the invention to the precise forms disclosed. Persons skilled in the relevant art can appreciate that many modifications and variations are possible in light of the above disclosure. For example, in one mode of operation a menu of options is presented to the user to choose from. In such case, the execution of the steps is performed simultaneously or concurrently also known as multitasking. In one embodiment, parallel computing is used.

Some portions of this description describe the embodiments of the invention in terms of algorithms and symbolic representations of operations on information. These algorithmic descriptions and representations are commonly used by those skilled the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have bees selected to delineate or circumscribe the inventive subject matter. It is therefore, intended that the scope of the invention be limited not by this detailed description, but rather by any claims that issue on an application based hereon.

Although various embodiments, which incorporate the teachings of the present invention have been shown and described in detail herein, those skilled in the art can readily devise many other varied embodiments that still incorporate these teachings.

I claim:

1. A computer-implemented method, comprising:
   a. accepting a request to exchange data propagated toward at least one computing device;
   b. defining new set mapping execution between two (2) or more exchange apparati, each with access to data storage of underlying identities, that share one (1) or more common identifiers;
   c. propagating toward said exchange apparati parameters necessary to evaluate the acceptability of the data exchange;
   d. receiving from said exchange apparati parameters defining the status of the request; and
   e. receiving from said exchange apparati resultant values from a deterministic obfuscating function with inputs that include, at minimum, a secret value shared exclusively among said exchange apparati and values of the common identifier(s);
   wherein said at least one computing device is communicatively coupled to each of the exchange apparati enacting data exchange between said exchange apparati by comparing resultant values transmitted by the exchange apparati, thereby establishing a triple-blind information exchange and facilitating inhibition of unintentional disclosure and re-identification of the underlying identities of the exchange apparati.

2. The method of claim 1, wherein the facilitator discards the data after comparing the data.

3. The method of claim 1, wherein the facilitator declines to inform the exchange apparati of the presence of intersection of identities due to an observed match quantity less than a given threshold.

4. The method of claim 1, wherein each apparatus transforms all identifying information using a function, in which the output of the function will be exchanged in lieu of any of the identifying information.

5. The method of claim 1, wherein the facilitator produces and shares a randomly generated nonce to add to the input of the function.

6. The method of claim 4, wherein each apparatus encodes all identifying information using a hashing algorithm where the output of the function will be irreversible to the input of the function via practical means.

7. The method of claim 1, wherein each apparatus produces and shares a randomly generated nonce to add to the input of the function prior to employing a hashing algorithm, providing assurance that no output of the function is deterministically resolved solely from the identifying information and that no single participant has defined the full input to the function.

8. The method of claim 1, wherein the apparati derive a shared secret known only by the apparati, with this secret added to the input of the function prior to employing a hashing algorithm, providing assurance that any third-parties, facilitator included, cannot reconstruct the full input to the function.

9. The method of claim 1, wherein the exchange apparati propagate spurious outputs of the function to obscure the quantity of original identities exchanged by generating random outputs of the function indiscernible from genuine outputs of the function with the purpose of inducing inflated quantities of non-matches.

10. The method of claim 1, wherein the facilitator performs comparisons on the outputs of the function to determine the intersection of identities common to multiple participants and communicate the comparison results to the apparati.

11. The method of claim 1, wherein apparati exchange spurious outputs of the function to obscure the quantity of original identities mapped by adding pre-negotiated constants to the collection of identifying information with the purpose of inducing inflated quantities of matches.

12. A system comprising:
  at least one computing device communicatively coupled to at least one (1) apparatus, said apparatus communicatively coupled to another apparatus and sharing a common identifier to thereby facilitate data exchange between said two (2) apparati and the at least one computing device thereby establishing a triple blind information exchange;
  a non-transitory computer readable medium having stored thereon instructions that, upon execution by the at least one computing device, cause the computing device to perform the steps comprising:
    (a) accepting a request to exchange data propagated toward the at least one computing device;
    (b) defining new set mapping execution between the exchange apparati;
    (c) propagating toward said exchange apparati parameters necessary to evaluate the acceptability of the data exchange;
    (d) receiving from said exchange apparati parameters defining the status of the request; and
    e. receiving from said exchange apparati resultant values from a deterministic obfuscating function with inputs that include, at minimum, a secret value shared exclusively among said exchange apparati and values of the common identifier(s);
  wherein all parties to the exchange of information are blind thereby making the exchange secret and unintentional disclosure and re-identification of the underlying identities of the exchange apparati are inhibited.

13. The system of claim 12, wherein the at least one (1) computing device is a third-party facilitator, which produces and shares a randomly generated nonce to add to the input of a function.

14. The system of claim 12, wherein apparati opt to conjoin the third party to facilitate direct comparisons of the outputs of the function on behalf of the apparati.

15. The system of claim 12, wherein the apparati derive a shared secret known only by the apparati, with this secret added to the input of the function prior to employing a hashing algorithm, providing assurance that any third parties, facilitator included, cannot reconstruct the full input to the function.

16. The system of claim 12, wherein a non-party to the protocol is excluded.

* * * * *